Patented Apr. 30, 1940

2,198,859

UNITED STATES PATENT OFFICE 2,198,859

PROCESS FOR DECAFFEINATING COFFEE

Eugen Bürgin, Schaffhausen, Switzerland, assignor to Max Brunner & Co., Schaffhausen, Switzerland No Drawing. Application April 20, 1939, Serial No. 269,013. In Germany May 18, 1938

4 Claims. (Cl. 99—69)

All the methods, made use of in practice, extract by means of solvents the caffein out of the beans previously swelled by water or steam. Afterwards the solvents are driven out of the beans with steam. As only a very intensive treatment of the beans succeeds in driving entirely the solvents out, it was often tried to carry out the extraction of caffein without using solvents.

This new method of extracting caffein is described for the first time in the Swiss patent specification No. 169,031. It is already known that raw coffee beans can be boiled out several times with water and that the pumped-off solutions can be treated in a special apparatus with adsorption substances, after a preliminary filtering and following concentration and that the filtered infusions can be added again to the beans. The extracted coffee beans are dried before the solution free from caffein is added thereto.

I have found a way to carry out the process of making coffee free from caffein in one operation and in the shortest time without the use of special apparatuses and without separating the watery solutions from the coffee beans, by adding adsorption substance to the coffee beans which are placed in an outer container whilst the absorption substance is enclosed in a water permeable vessel located in said container and consisting of metal, textiles, ceramic or other suitable material. Said water permeable vessel may be of any suitable form and may be suspended on the wall of the outer container or fixed thereto or it may lie between the coffee beans. After two or three hours reaction, the coffee beans and the watery solution are free of caffein. The active substance may be left in the extractor during the ensuing evaporation of the water and drying of the beans.

I have also found that the natural colour of the coffee is retained if formic acid or another reducing agent is added during the process. Only substances are added which do not leave any residues in the coffee beans.

Example

In a rotating vessel of 3500 litres capacity, 1000 kg. of raw coffee beans and 2000 litres of water and 50 kg. of active carbon enclosed in a permeable vessel are heated for two hours at 80–110° C. Then 2 kg. of formic acid are added and the water evaporated in vacuum. The coffee is then dried down to 5 to 10% moisture content. Rotation of the first mentioned vessel is performed with a view to obtain a continuous whirling of the coffee beans and the water and to obtain a uniform treating of all the beans.

What I claim is:

1. The process of decaffeinating coffee, consisting in heating the raw coffee beans with water in the presence of an adsorption agent, which is enclosed in a liquid permeable vessel evaporating the water under vacuum after absorption is completed, and drying the coffee beans after they have been decaffeinated.

2. The process of decaffeinating coffee, consisting in heating the raw coffee beans with water in the presence of an adsorption agent, which is enclosed in a liquid permeable vessel, adding, after absorption is completed, a reducing agent which does not leave any residues in the coffee beans after they have been decaffeinated and finally drying the coffee beans by evaporating the water.

3. The process of decaffeinating coffee, consisting in heating the raw coffee beans with water in the presence of an adsorption agent which is enclosed in a liquid permeable vessel, adding small quantities of formic acid after absorption is completed and drying the coffee beans after they have been decaffeinated in vacuum by evaporating the water.

4. The process of decaffeinating coffee, consisting in treating 1000 kg. of raw coffee beans with 2000 litres of water in a rotating vessel in the presence of 50 kg. of active carbon enclosed in a water permeable vessel, heating said vessel for about two hours at 80 to 110°, adding 2 kg. of formic acid, evaporating the water under vacuum and finally drying the coffee beans down to 5 to 10% moisture content.

EUGEN BÜRGIN.